United States Patent
Lindberg et al.

(10) Patent No.: US 10,766,356 B2
(45) Date of Patent: Sep. 8, 2020

(54) ACTIVE GRILLE, SCALABLE DESIGN

(71) Applicant: Magna Exteriors Inc., Concord (CA)

(72) Inventors: Braendon Lindberg, Oxford, MI (US); Ross Parpart, Troy, MI (US); Jeffrey B. Manhire, Rochester, MI (US)

(73) Assignee: MAGNA EXTERIOR INC.

( * ) Notice: Subject to any disclaimer, the term of this patent is extended or adjusted under 35 U.S.C. 154(b) by 0 days.

(21) Appl. No.: 16/704,969

(22) Filed: Dec. 5, 2019

(65) Prior Publication Data

US 2020/0108711 A1    Apr. 9, 2020

Related U.S. Application Data

(63) Continuation of application No. 16/322,324, filed as application No. PCT/IB2017/054926 on Aug. 11, 2017, now Pat. No. 10,525,819.

(60) Provisional application No. 62/374,375, filed on Aug. 12, 2016.

(51) Int. Cl.
| | |
|---|---|
| B60K 11/08 | (2006.01) |
| F24F 13/15 | (2006.01) |
| B29C 48/09 | (2019.01) |
| B29C 48/00 | (2019.01) |
| B29C 45/00 | (2006.01) |
| F01P 7/10 | (2006.01) |
| B29K 23/00 | (2006.01) |
| B29K 55/02 | (2006.01) |
| B29K 77/00 | (2006.01) |
| B29K 509/08 | (2006.01) |
| B29L 31/30 | (2006.01) |

(52) U.S. Cl.
CPC .......... *B60K 11/085* (2013.01); *B29C 45/006* (2013.01); *B29C 48/0021* (2019.02); *B29C 48/09* (2019.02); *F24F 13/15* (2013.01); *B29K 2023/12* (2013.01); *B29K 2055/02* (2013.01); *B29K 2077/00* (2013.01); *B29K 2509/08* (2013.01); *B29L 2031/3005* (2013.01); *F01P 7/10* (2013.01); *Y02T 10/88* (2013.01)

(58) Field of Classification Search
CPC .................................................... B60K 11/08
See application file for complete search history.

(56) References Cited

U.S. PATENT DOCUMENTS 10,525,819 B2 * 1/2020 Lindberg ............. B60K 11/085

* cited by examiner

*Primary Examiner* — John D Walters
*Assistant Examiner* — James J Triggs
(74) *Attorney, Agent, or Firm* — Warn Partners P.C.

(57) ABSTRACT

An active grille shutter arrangement having an assembled modular frame with a plurality of primary frame pieces formed by extrusion. Each one of the plurality of primary frame pieces has a first end, a second end and at least one key slot extending between the first end and the second end. Each of the plurality of frame pieces also includes a hollow bore extending through the each one of the plurality of primary frame pieces forming an aperture at the first end and an aperture at the second end. When the modular frame is assembled there is an upper frame portion and lower frame portion, both formed from one of the plurality of primary frame pieces. The arrangement also includes a number of alternate frame and vane pieces that allow several different active grille shapes and configurations to be formed.

20 Claims, 8 Drawing Sheets

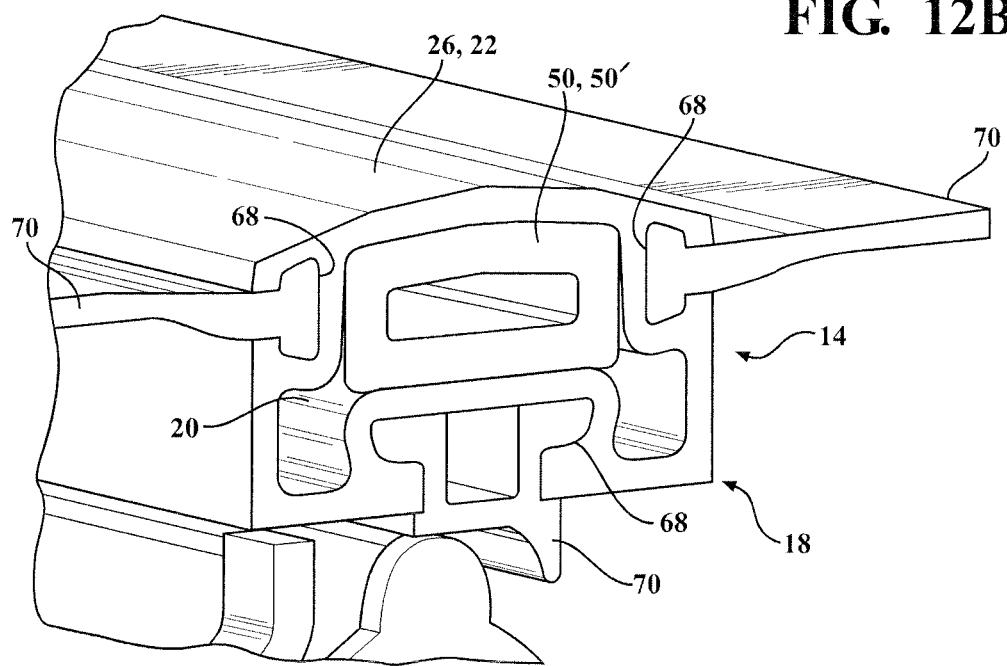
FIG. 12B
FIG. 13
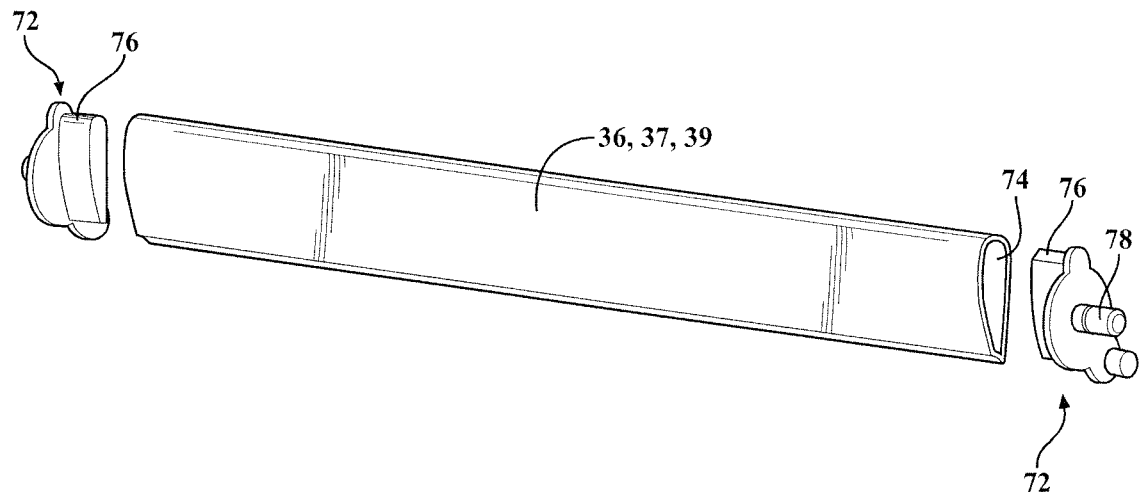

ACTIVE GRILLE, SCALABLE DESIGN

CROSS-REFERENCE TO RELATED APPLICATIONS

This application is a continuation of U.S. Non-Provisional Application No. 16/322,324 filed Jan. 31, 2019, which is a 35 USC 371 National Stage Application of PCT/IB2017/054926 filed Aug. 11, 2017, which claims priority to U.S. Provisional Application No. 62/374,375; filed Aug. 12, 2016. The disclosures of the above applications are hereby incorporated herein by reference.

FIELD OF THE INVENTION

The present invention relates to active grille shutters that are scalable and versatile and use cost effective manufacturing methods and universal component designs to reduce development and program cost.

BACKGROUND OF THE INVENTION

Various attempts have been made to optimize the cooling of various automobile parts. Some of the various devices developed have been designed to control the air flow throughout the engine compartment of the automobile such that the desired amount of heat is transferred away from the engine, transmission, and other components which generate heat, in order to maintain an optimal operating temperature.

It is also desirable to bring the engine up to the normal operating temperature as soon as possible after engine start-up. When the engine is substantially the same temperature as the surrounding environment and is turned on, the engine is the least fuel efficient (especially during start-up and the temperature of the surrounding environment is cold). The reduced fuel efficiency is why it is considered desirable to bring the engine up to the optimal operating temperature very quickly. Under these conditions, it is not desirable to remove heat away from the engine and the various components surrounding the engine, and therefore devices designed to control air flow around the engine are more beneficially used if they do not remove heat away from the engine at start-up. Active grille systems that have been developed implement a frame that is typically molded as a complete part. As a result current active grille shutter components require large tooling investments and are typically unique to one vehicle. A disadvantage to current designs is that for each new program, a new design is required to be developed and retooled. Additionally, the one piece frame has a low shipping density as it is mostly empty space. Furthermore, if an active grille system application requires additional vanes or a different base air flow, a complete new frame must be molded and shipped. It is therefore desirable to provide a scalable and versatile frame that uses cost effective manufacturing methods and universal component designs to reduce development and program cost. It is also desirable to develop scalable designs that will increase the shipping density since the various components can be stacked more closely together.

SUMMARY OF THE INVENTION

The present invention allows for the use of cost effective manufacturing methods and universal component designs that can be used to fit multiple programs of varying size and shape without the need for re-development or new tooling.

The present invention relates to an active grille shutter arrangement having an assembled modular frame with a plurality of primary frame pieces formed by extrusion.

Each one of the plurality of primary frame pieces has a first end, a second end and at least one key slot extending between the first end and the second end. Each of the plurality of frame pieces also includes a hollow bore extending through the each one of the plurality of primary frame pieces forming an aperture at the first end and an aperture at the second end. When the modular frame is assembled there is an upper frame portion and lower frame portion, both formed from one of the plurality of primary frame pieces.

A motor housing extends between the upper frame portion and the lower frame portion and has two or more vane apertures formed on the motor housing. The motor housing is formed by injection molding. There is further provided a plurality of secondary frame pieces formed by injection molding where each of the plurality of frame pieces has an upper nose portion and a lower nose portion. One of the secondary frame pieces is used as a first end cap and another of the plurality of secondary frame pieces is a second end cap. The first end cap is connected by sliding the upper nose portion into the aperture formed at the first end of the upper frame portion and sliding the lower nose portion into the aperture formed at the first end of the lower frame portion. The second end cap is connected by sliding the upper nose portion in to the aperture of the second end of the upper frame portion and sliding the lower nose portion into the aperture of the lower frame portion. Once assembled the modular frame defines the one or more apertures through which air can pass.

The assembled modular frame further includes a plurality of vanes formed by extrusion. Each one of the plurality of vanes are rotatably positioned within the one or more apertures for controlling the amount of air flowing through the one or more apertures formed by the assembled modular frame. A first end of each of the plurality of vanes is rotatably connected to one of the first end cap or the second end cap and a second end each of the plurality of vanes is rotatably connected to the motor housing. There is also a transmission mechanism connected between the plurality of vanes for causing the plurality of vanes to rotates between a closed position and an open position in response to actuation of a motor contained in the motor housing and connected to at least one of the plurality of vanes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

FIG. 12B is a side cross-sectional view of a primary frame piece and a portion of the nose of an end cap placed within the primary frame piece.

FIG. 13 shows a side perspective view of a single vane with endcaps connected.

DETAILED DESCRIPTION OF THE PREFERRED EMBODIMENTS

The following description of the preferred embodiment(s) is merely exemplary in nature and is in no way intended to limit the invention, its application, or uses.

Figure 1:
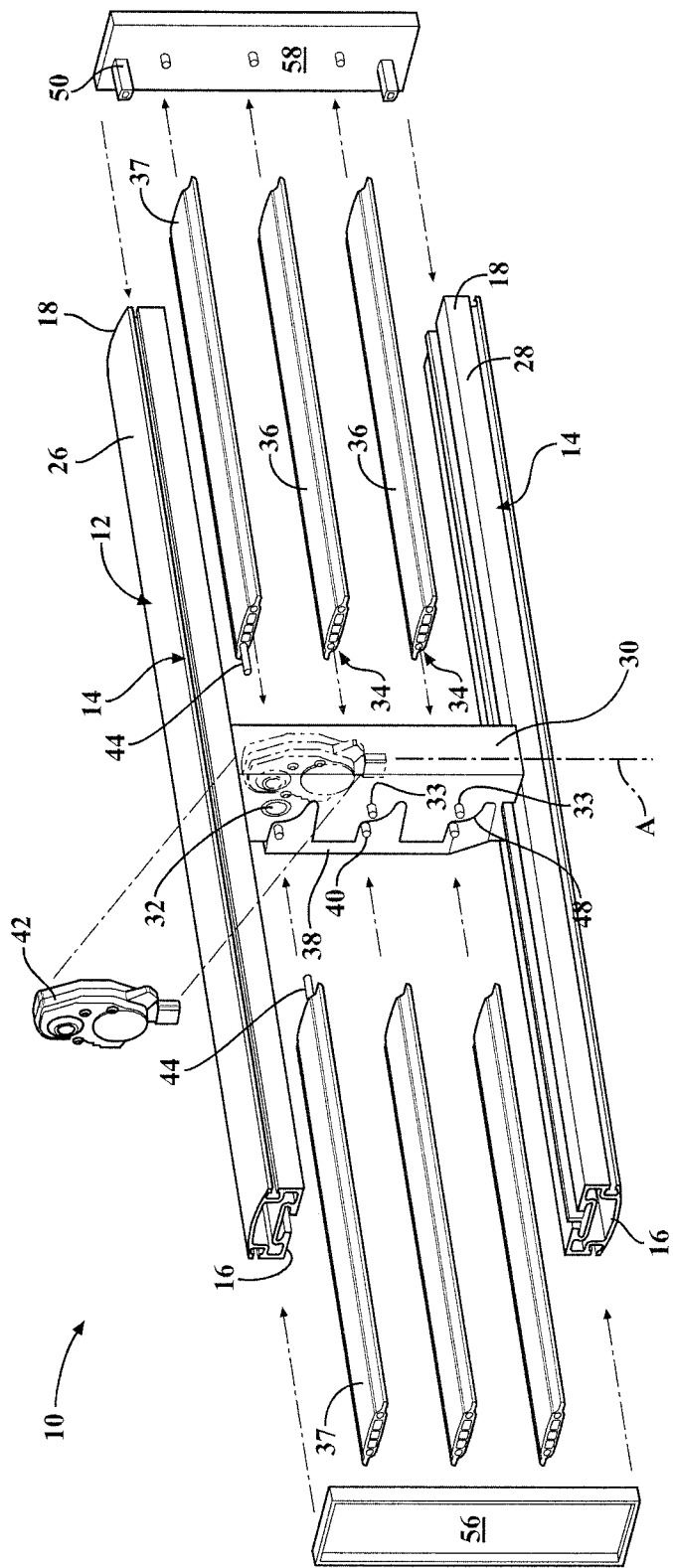
FIG. 1 is a perspective and exploded view of a portion of the modular frame according to one embodiment of the invention.
Figure 2:
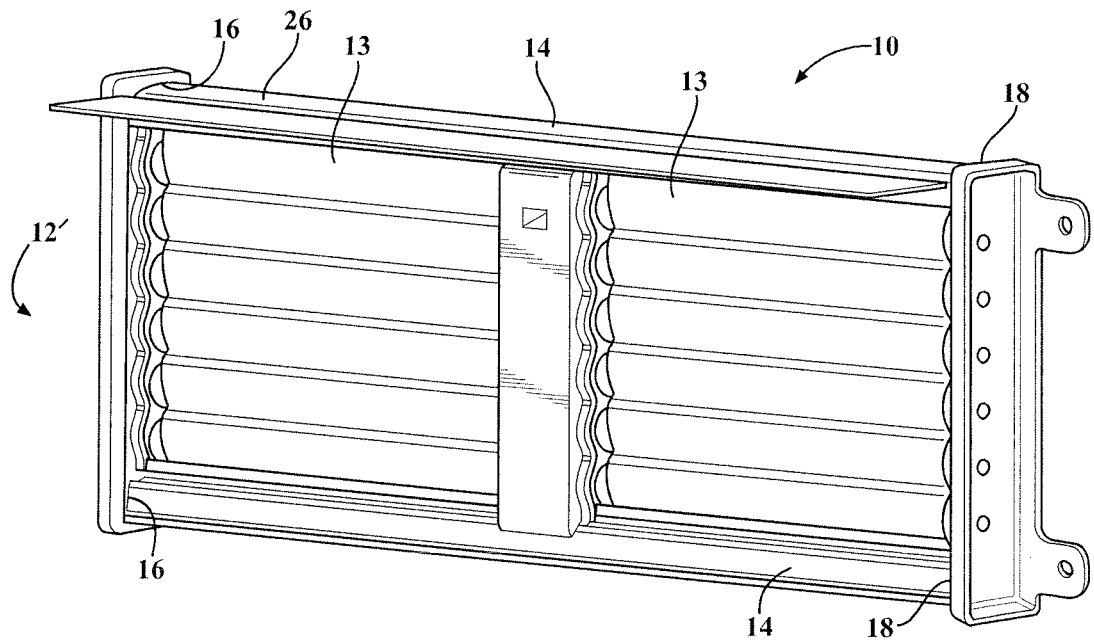
FIG. 2 is a perspective view of a modular frame with one shape according to another embodiment of the invention.
Figure 3:
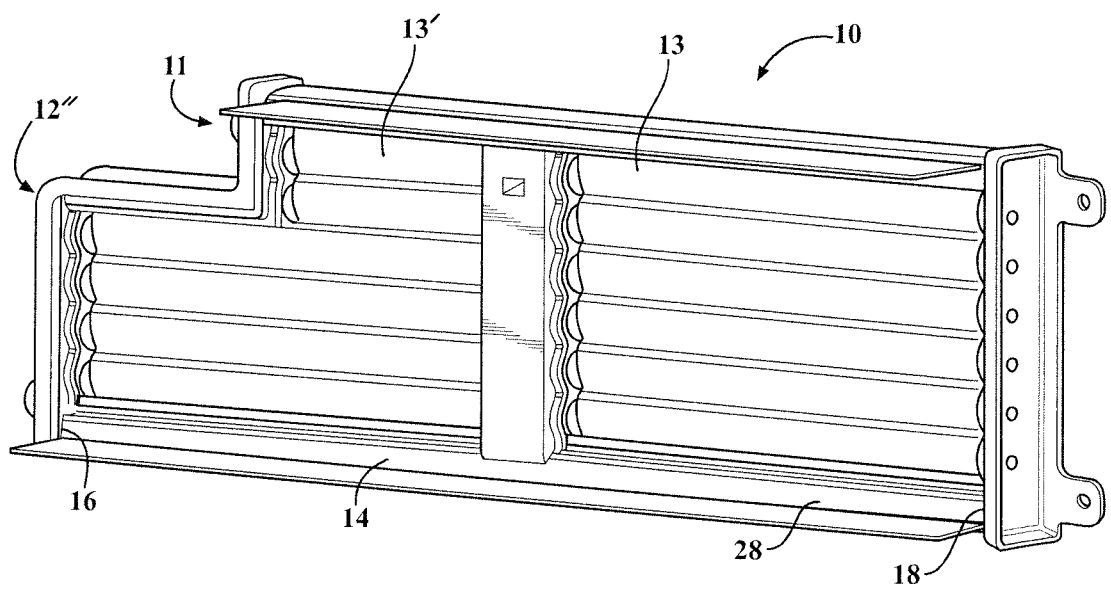
FIG. 3 is a perspective view of a modular frame with a second shape according to the present invention.
Figure 4:
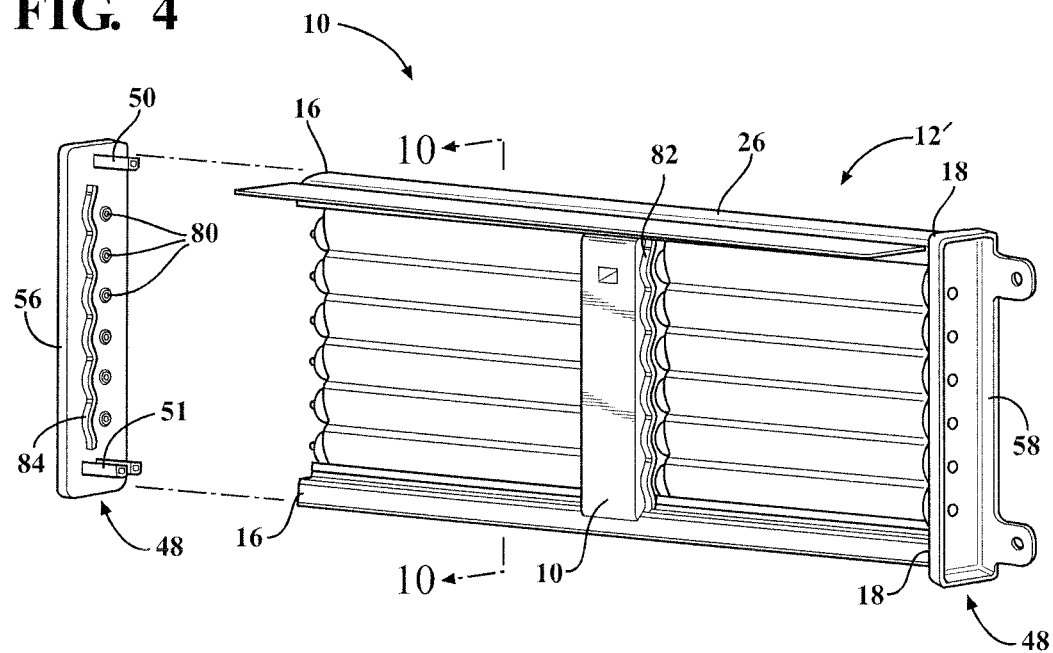
FIG. 4 shows alternate end caps of the present invention separated from the modular frame.
Figure 5:
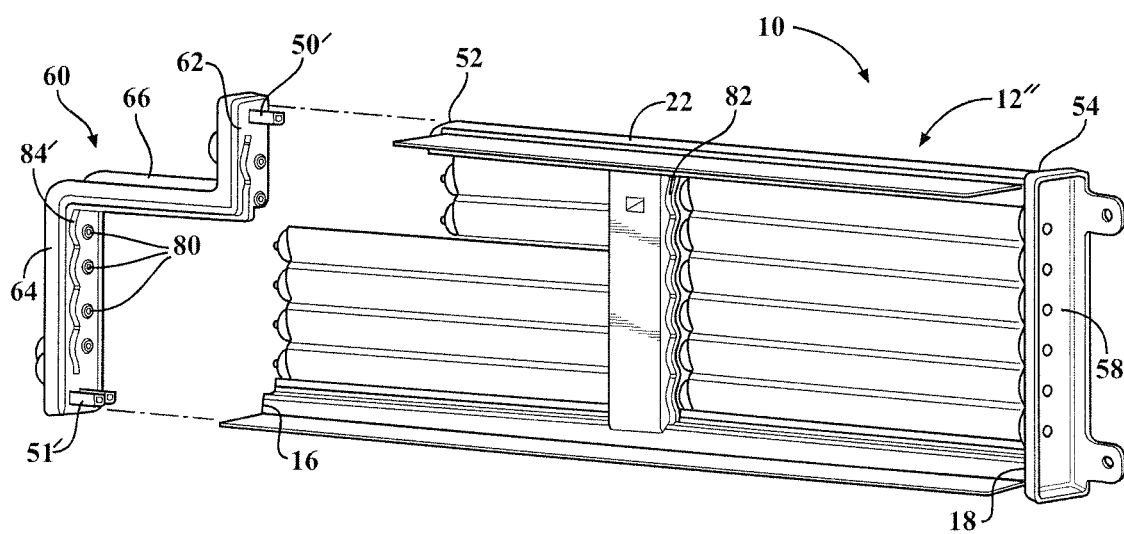
FIG. 5 are perspective views demonstrating the package density of the components of the present invention.
Figure 6:
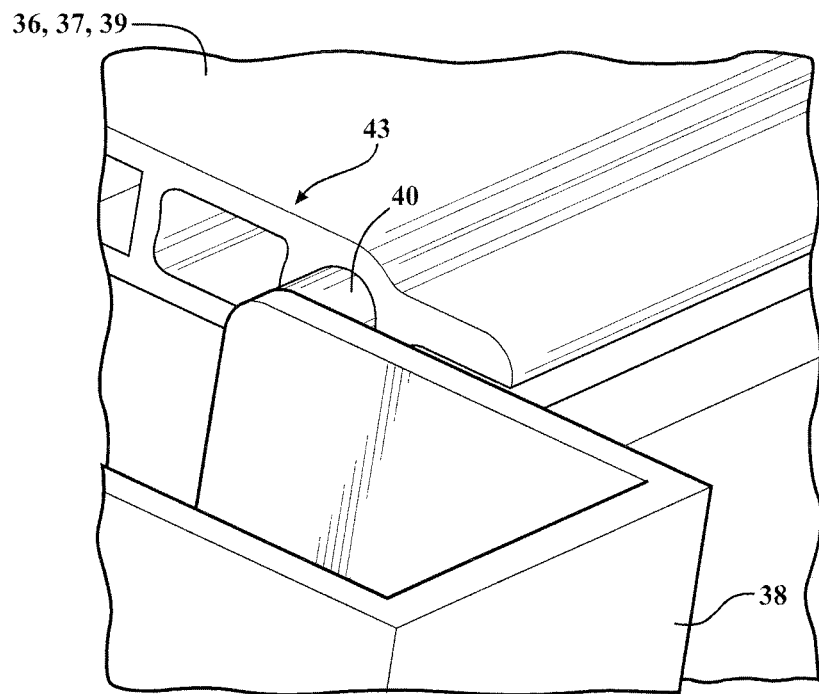
FIG. 6 is an enlarged perspective view of a connection between a link bar and one of the plurality of vanes.
Figure 7:
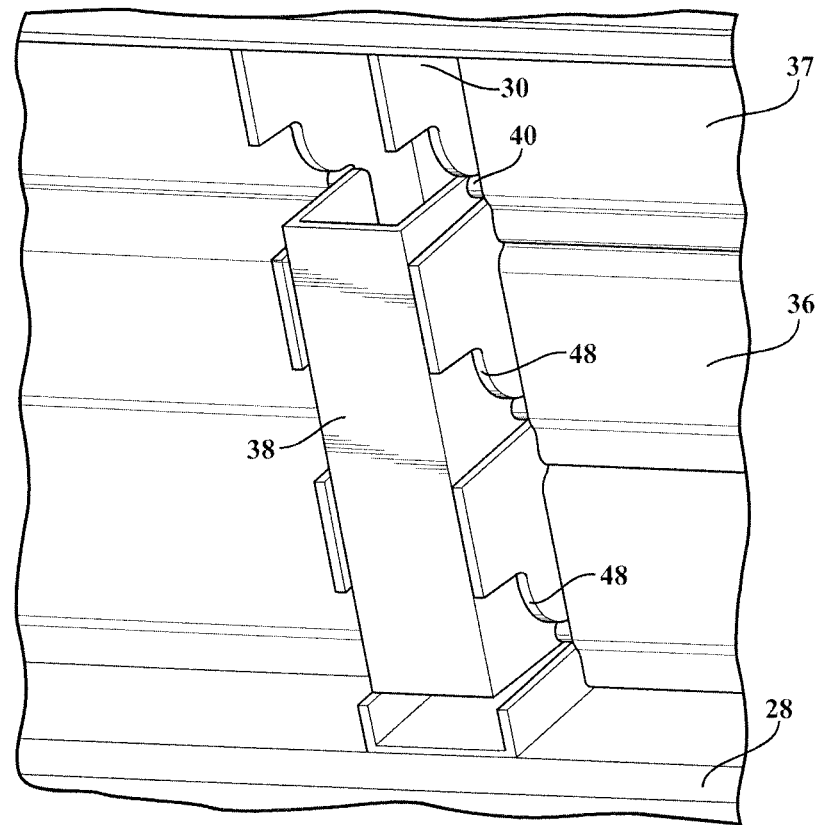
FIG. 7 is a rear perspective view of the link bar with openings and cam surfaces formed on the center bar of the modular frame.

Referring now to FIGS. 1-5 a modular active grille shutter arrangement 10 according to the present invention is shown including parts of varying sizes used to create different modular frames. FIGS. 1, 2 and 4 show a modular frame 12,12' having a first shape, that is generally rectangular. FIGS. 3 and 5 show a modular frame 12" having a second shape that has a bend 11. In FIG. 2 the modular frame 12' has two apertures 13 of equal size, while in FIG. 3 there is one aperture 13 that is the same as the apertures 13 shown in FIG. 2 and there is a second aperture 13' having a different shape with a portion of the aperture 13' having a smaller width due to the presence of the bend 11. The different shapes are made possible by having different sized primary frame pieces, secondary frame pieces and vanes as will be described in greater detail below.

Figure 11:
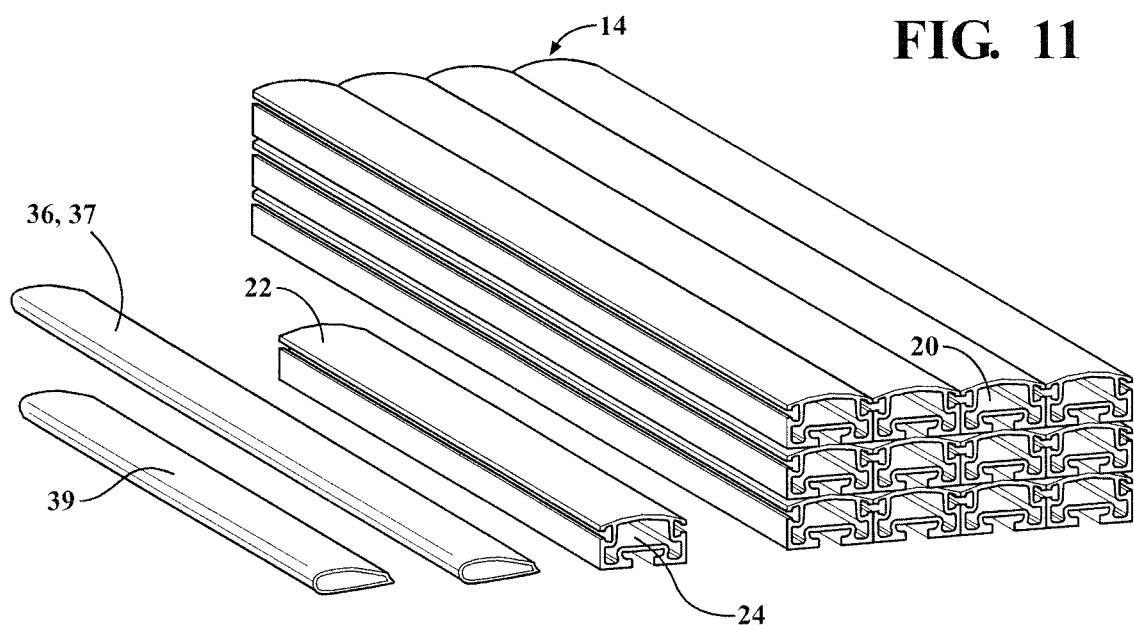
FIG. 11 is a perspective side view demonstrating the packaging density of the individual components of the invention.

Each modular frame 12, 12', 12" has primary frame pieces 14, formed by extrusion or injection molding with each one of the plurality of primary frame 14 pieces having a first end 16 and a second end 18. A hollow bore 20 extends through the each one of the plurality of primary frame pieces 14 forming an aperture at the first end 16 of the primary frame piece 14 and an aperture at the second end 18 of the primary frame piece 14. Each primary frame piece 14 is interchangeably used in a couple of different locations in the modular frame 12, 12', 12". As shown in FIGS. 1, 2 and 4 an upper frame portion 26 of the assembled modular frame 12, 12", is formed from at least one of the plurality of primary frame pieces 14 and a lower frame portion 28 of the assembled modular frame 12, 12' formed from at least one of the plurality of primary frame pieces 14. FIGS. 3, 5 and 11 show an alternate frame piece 22 that has a hollow bore 24 (shown in FIG. 5) extending between a first end 52 and a second end 54 of the alternate frame piece 22. The alternate frame piece 22 has a length that is shorter than the upper frame piece 26 or lower frame piece 28. Also the alternate frame piece 22 can be used in place of the lower frame portion 28 depending on the desired shape of the modular frame 12, 12". It is also possible to have both the upper frame portion 26 and lower frame portion 28 be interchanged with a separate alternate frame piece 22, which is part of a set of components (shown in FIG. 11) used for forming the modular frame 12, 12', 12".

The modular frame 12, 12' includes a motor housing 30 formed from injection molding and having two or more motor apertures 32 formed on each side of the motor housing 30 for a driven vane 37 to a motor 42. The plurality of vanes refers to the vanes generally and also includes the linked vanes 36, driven vane 37 and alternate vanes 39. There are also two or more pivot posts 33 extending from the motor housing 30 for sliding into apertures 34 formed on the ends of the linked vanes 36. This allows the linked vanes 36 to rotate on pivot posts 33. The driven vane 37 is not connected to pivot posts 33 or the motor housing but is instead driven directly by the motor 42 through a shaft 44 connection through the motor apertures 34 of the motor housing 30. The shaft 44 as shown is connected to an aperture 34 of the driven vane 37, however, it is possible for the shaft 44 to extend from the motor 42 or have some other form. As the driven vane 37 rotates, rotational force is transferred to the linked vanes 36 by a transmission mechanism in the form of a link bar 38 that has posts 40 configured to slide into one of the apertures 34 on one of the plurality of vanes 36 and driven vane 37. The link bar 38 moves upward and downward relative to the axis A (shown in FIG. 4) while allowing the plurality of vanes 36 and driven vane 37 to rotate about the respective posts 40 of the link bar 38 and the posts 33 on the motor housing 33. As best shown in FIG. 1 the motor housing 30 has a cam surface 48 that touches the posts 40 on the link bar 38 for guiding the vertical movement of the link bar 38 when the vanes 36, 37 are rotating between an open position and closed position. FIGS. 3 and 5 show the alternate vanes 39 that have the same apertures 34 and the driven vane 37 or plurality of vanes 36, with the only difference being that the length of the vanes 39 is shorter than the length of the vanes shown in FIGS. 1, 2 and 4.

The modular frame 12, 12" also includes a plurality of secondary frame pieces 28 formed by injection molding. The plurality of secondary frame pieces 28 include a first end cap 56 and a second end cap 58 each having an upper nose portion 50 and a lower nose portion 52. The first end cap 56 is connected to the upper frame piece 26 at the upper nose portion 50. The first end cap 56 is further connected to the lower frame piece 28 at the lower nose portion 51. A second end cap 58 of the plurality of secondary frame pieces 34 is connected to the upper frame piece 26 by sliding the upper nose portion 50 into the second end 18 of the upper frame piece 26. The second end cap 58 is connected to the lower frame piece 28 by sliding the lower nose portion 51 into the second end 18 of the lower frame portion 28.

FIG. 4 shows another type of secondary frame piece that is an alternate end cap 60 that has a different shape than the first end cap 56 and the second end cap 58, which results in the assembled modular frame 12" having a different shape. The alternate end cap 60 has an upper nose 50' configured to slide into an aperture 24 at a first end 52 of the alternate upper frame pieces 22 and the second end 18 of the lower frame portion 28. While a single alternate end cap 60 is shown, it is within the scope of this invention for more than one alternate end caps to be used depending on a particular application. The alternate end cap 60 has an upper vertical portion 62 with an upper nose 50', a lower vertical portion 64 with a lower nose 51' and a horizontal portion 66 connecting between the upper vertical portion 62 and the lower vertical portion 64, where the alternate end cap 60 is a interchangeable with the first end cap 56 and the second end cap 58.

When the first end cap 56, the second end cap 58 or alternate end cap 60 are connected to the upper frame piece 26, the lower frame piece 28 or alternate frame piece 22; apertures 13, 13' of the assembled modular frame 12, 12', 12" are defined by the motor housing 30, the first end cap 56, the second end cap 58, alternate end cap 60 (as shown in FIG. 4), the upper frame piece 26, alternate frame piece 22 (as shown in FIG. 4) and the lower frame piece 28. The apertures 13, 13' are opened and closed by rotation of the plurality of vanes, that is the driven vane 37, linked vanes 36 and alternate vanes 39 all powered by the motor 42.

Figure 12A:
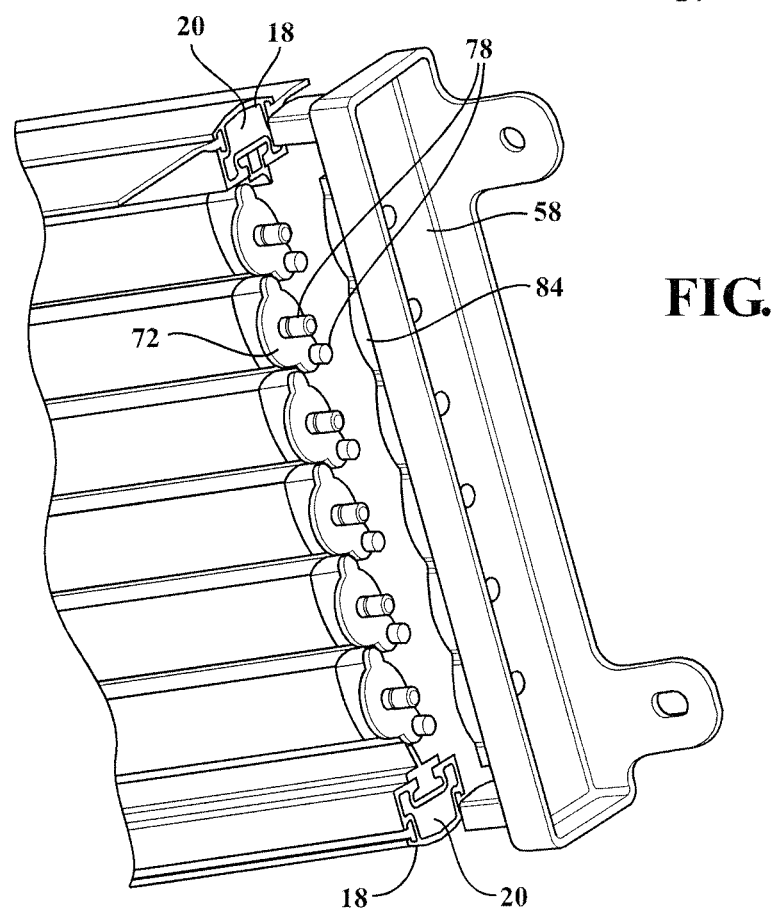
FIG. 12A is a partial exploded perspective view of one side of the modular frame.

Referring now to FIG. 12B a cross-sectional view of the second end 18 of the upper frame 26 or alternate upper frame 22 is shown. Within the hollow bore 20 the upper nose 50, 50' of the second end cap 58 or alternate end cap 60 is shown placed within the hollow bore 20. The upper frame 26 or alternate upper frame 22, like all the other primary frame pieces 14 includes a plurality of key slots 68 for receiving a seal 70 used to seal the active grille shutter arrangement 10 and prevent air from flowing around the active grille shutter arrangement 10. The key slots 68 allow for the attachment of various components including vehicle radar systems or motion sensors. Also rubber vanes or seals 70 are attached, which are shown in the drawings and are extruded having a matching cross-sectional T-shaped configured to be able to slide within to the key slots 68. Additional components that can be attached using the versatile key slot feature include body attachment brackets air seals fascia panel supports wire harness clips FPM sub-structure etc.

FIG. 13 depicts an alternate embodiment showing an end cap 72 connection usable with each one of the linked vanes 36, driven vane 37 or alternate vane 39 is shown. In this particular embodiment each of the vanes have a single hollow channel 74 and extending through the length of the plurality of vanes 36, driving vane 37 or alternate vane 39, with end caps 72 having a nose 76 configured to slide into the single hollow channel 74 at each end of the vane. Each of the end caps 72 are formed by injection molding and include to have it posts 78 that are configured to slide into apertures formed on the motor housing 30 and link bar 38, that are used instead of posts 40 on the link bar 38 and posts 33 on the motor housing 30.

Referring now to FIGS. 4 and 5, the pivot posts 78 on the opposite sides of the vane 36, 37, 39 are configured to slide into an aperture 80 formed on the first end cap 56, second end cap 58 or alternate end cap 60. In this particular embodiment there is also a cam surface 82 formed on each side of the motor housing 30 as well as a cam surface 84, 84' formed on the first end cap 56, the second end cap 58 or the alternate end cap 60 which is used to guide one of the posts 78 during rotation of the vanes 36, 37, 39. This alternate embodiment using the end caps 72 on the vanes can be seen in FIGS. 2-5, 12A and 13.

Referring now to FIG. 11 the active grille shutter arrangement, prior to assembly has a high packaging density. FIG. 11 shows the primary frame pieces 14, which can be cut down in length to create the alternate frame piece 22. The primary frame pieces 14, can be stacked tightly together thereby allowing for greater shipping density. Also as shown in FIG. 11 is a stack of the linked vanes 36 and the driven vane 37, which can also be stacked tightly together for shipping purposes. Additionally the alternate vanes 39 can be created by taking one of the linked vanes 36 and cutting it down in length.

It is also within the scope of this invention for the parts of the modular frame kit to be used in other combinations to create other modular frame constructions having a height, width and shape that will vary depending on the different components used. It is further within the scope of this invention for the modular frame kit to have a greater or lesser number of alternate components having different dimensions and is not limited to just the alternative parts shown. The modular frame kit provides a great deal of versatility for the various components since the modular frame 12, 12', 12" can have a different size assembled from parts having different lengths. This allows the modular frame 12, 12', 12" to be used with various variants encountered in and incorporating active grille shutter arrangements on vehicles. This also increases the shipping density of the components of the modular frame by allowing similar parts to be packaged together more tightly than would be possible with a modular frame that is one piece. The increase shipping density is illustrated in FIG. 4.

Another unique feature of the present invention is that the various components can be made using different methods. For example the primary frame pieces and motor housing as well as the transmission member can be formed using injection molding while the primary frame members and vanes can be formed using an extrusion method. This substantially decreases the amount of total cost involved in making the active grille assembly. It will also allow for the scalability of the active grille assembly since assembled modular frames of different shapes and sizes can easily be made. Additionally creating the components separately also allows for different materials to be used which increases the structural capabilities of the active grille system. For example the vanes can be made of a different material than the end caps or upper and lower frame members. In one embodiment of the present invention the primary frame pieces and vanes are made of glass filled poly propylene or nylon materials while the motor housing and end caps are made of polypropylene or acrylonitrile butadiene styrene (ABS) materials. Any seals that are to be attached to the key slot feature can be extruded and made of rubber silicone or any other desirable material which would be more suitable than a harder polymer material.

Figure 10:
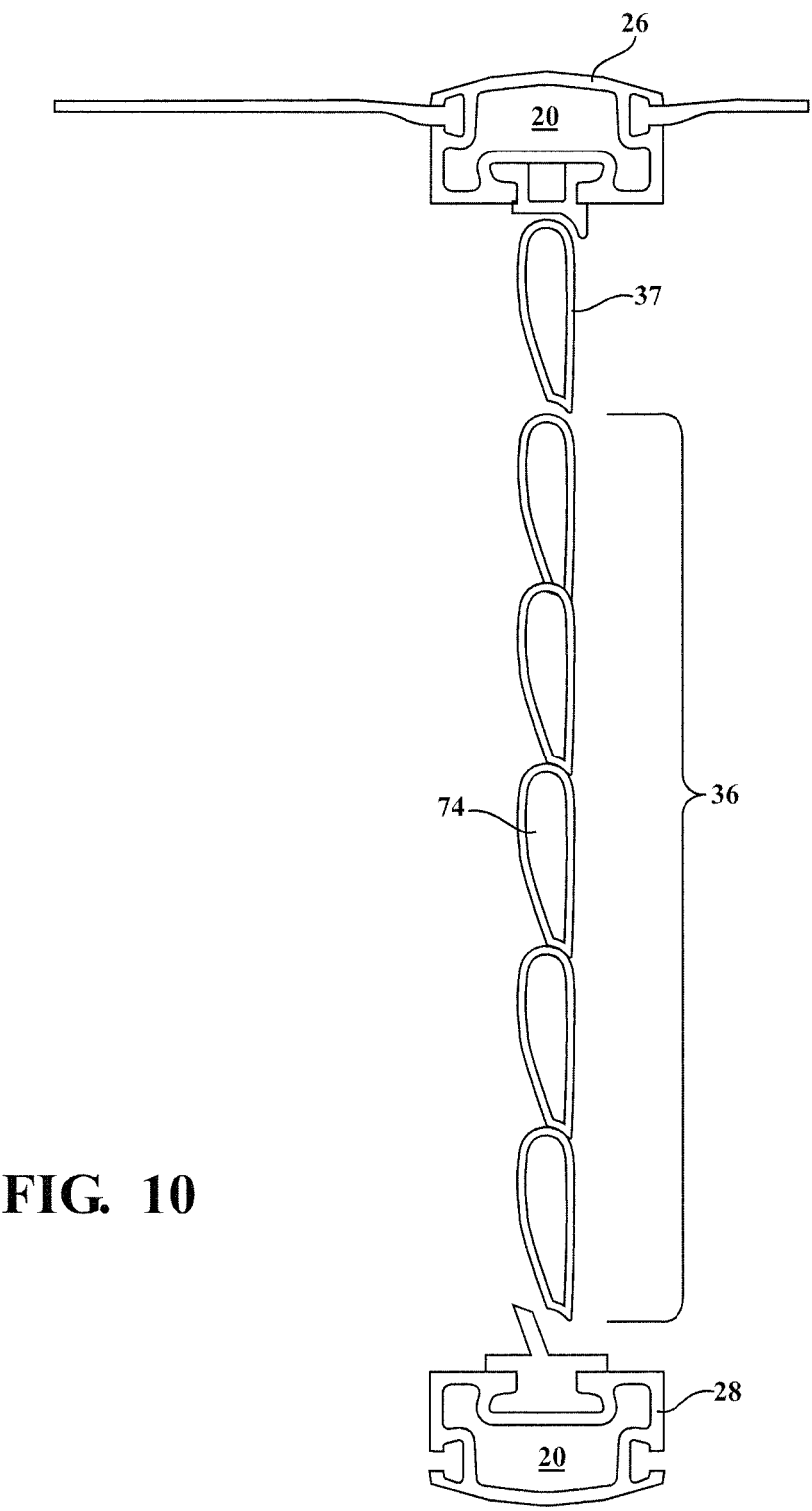
FIG. 10 is a cross-sectional side view of the modular frame in accordance with one embodiment of the present invention.

Referring now to FIG. 10 in another aspect of the present invention the upper frame member 26 and lower frame member 28 include the hollow bore 20. The driven vane, 37, and linked vanes 36 also have a hollow channel 74 made possible by forming the vanes using extrusion. The hollow bore 20 and hollow channel 74 reduce the weight of the modular frame 12, 12', which is desirable for many applications.

Figure 8:
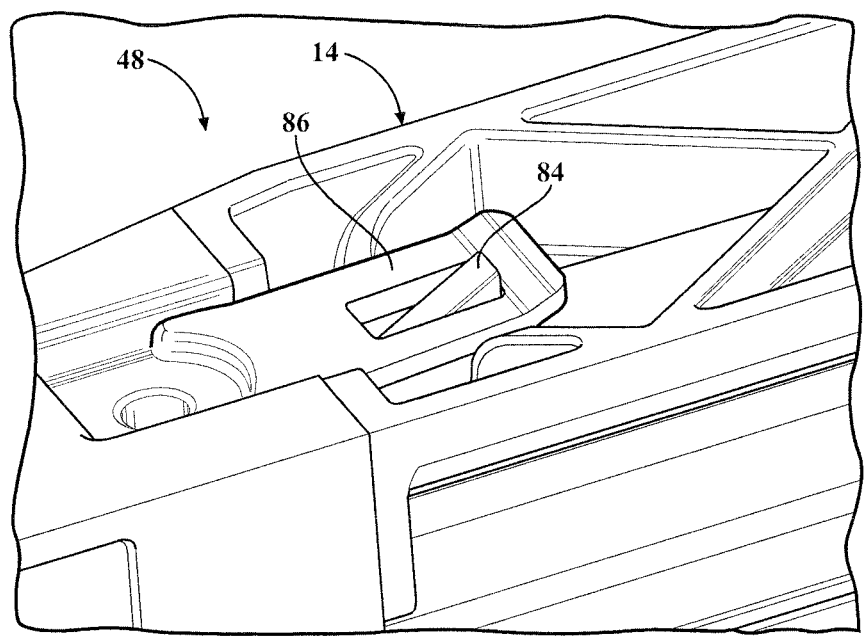
FIG. 8 is an enlarged view of locking tabs between the primary frame piece and the secondary frame piece.
Figure 9:
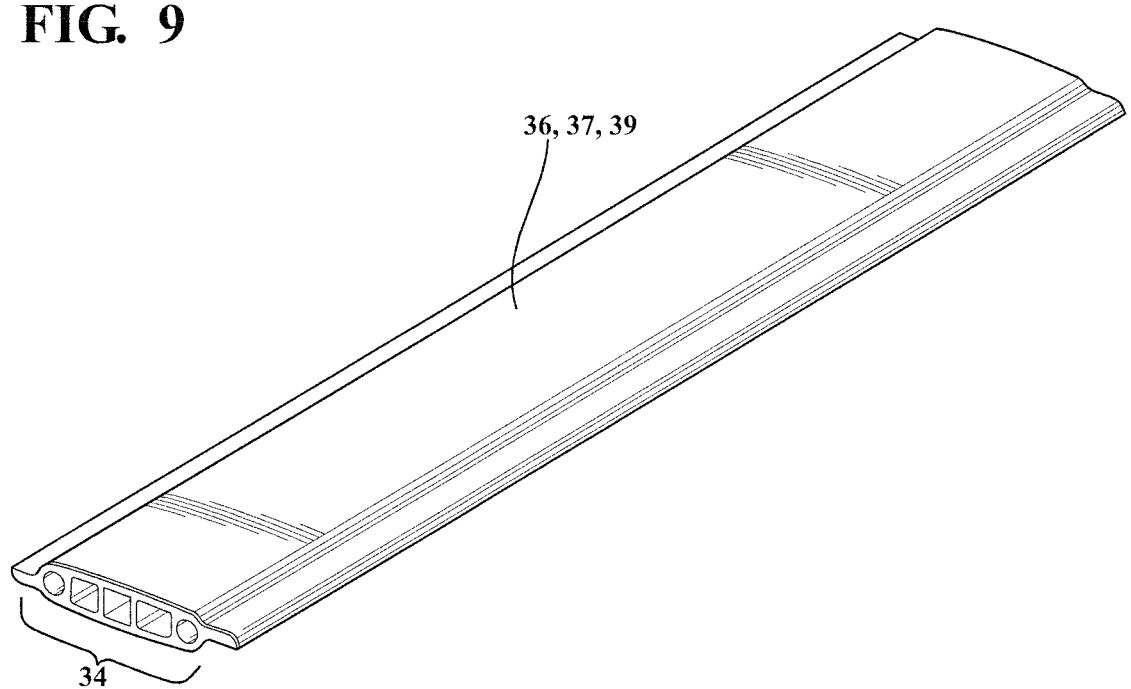
FIG. 9 is a side perspective view of a single extruded vane in accordance with the present invention.

Referring now to FIG. 8 a method of connecting one primary frame piece 14 to one secondary frame piece 28 using locking tabs. The primary frame piece 14 has a hook 84 formed thereon that is used to retain a resilient tab 86 formed on the secondary frame piece 28. Together the hook 84 and resilient tab 86 create a snap tab configuration that holds the primary frame piece 14 and the secondary frame piece 28 together without separate fasteners or adhesives. The number of locking tabs used will depend on the site and number of pieces of the modular frame 12, 12', 12". Also the locking tabs can be used in addition to adhesives or fasteners, where the snap tab configuration serves to align the primary frame piece 14 and secondary frame piece 28 while other attachments such as adhesives or fasteners are used.

What is claimed is:

1. An active grille shutter arrangement having an assembled modular frame comprising:

a plurality of primary frame pieces, formed by extrusion with each one of the plurality of primary frame pieces having a first end, a second end, a hollow bore extending through the each one of the plurality of primary frame pieces forming an aperture at the first end of the hollow bore and an aperture at the second end of the hollow bore;

an upper frame portion of the assembled modular frame formed from at least one of the plurality of primary frame pieces;

a lower frame portion of the assembled modular frame formed from at least one of the plurality of primary frame pieces;

a plurality of secondary frame pieces each having an upper nose portion and a lower nose portion, wherein the plurality of secondary frame pieces include a first end cap connected to the upper frame portion at the upper nose portion and the first end cap connected to the lower frame portion at the lower nose portion, a second end cap of the plurality of secondary frame pieces connected to the upper frame portion at the upper nose portion and the second end cap connected to the lower frame portion at the lower nose portion, wherein when the first end cap and the second end cap are connected to the upper frame portion and the lower frame portion, one or more apertures of the assembled modular frame are defined by the first end cap, the second end cap, the upper frame portion and the lower frame portion, and a plurality of vanes formed by extrusion, rotatably positioned within the one or more apertures for controlling the amount of air flowing through the one or more apertures, wherein a first end of each of the plurality of vanes is rotatably connected to at least one of the first end cap and second end cap.

2. The active grille assembly of claim 1 wherein each of the plurality of vanes is hollow and has an aperture at each end for receiving an end cap at the each end of the plurality of vanes, wherein each end cap on each of the plurality of vanes has one or more posts configured to slide into a respective aperture on one of the first end cap of the plurality of secondary frame pieces, or the second end cap of the plurality of secondary frame pieces, for rotatably connecting the plurality of vanes of the assembled modular frame.

3. The active grille assembly of claim 1 wherein each of the plurality of vanes has one or more pivot apertures at each end of the plurality of vanes for receiving posts formed on the surface of one of the first end cap of the plurality of secondary frame pieces and the second end cap of the plurality of secondary frame pieces for rotatably connecting the plurality of vanes to the assembled modular frame.

4. The active grille assembly of claim 1 wherein the upper nose of the first end cap of the plurality of secondary frame pieces slides into the aperture at the first end of the upper frame portion and the lower nose of the first end cap of the plurality of secondary frame pieces slides into the aperture at the first end of the lower frame portion, while the upper nose of the second end cap of the plurality of secondary frame pieces slides into the aperture at the second end of the upper frame portion and the lower nose of the second and slides into the aperture at the second end of the lower frame portion.

5. The active grille assembly of claim 1 further comprising:

at least one alternate primary frame piece having a length different than the other plurality of primary frame pieces;

at least one alternate vane having a length different than the other plurality of vanes;

at least one alternate secondary frame having an upper vertical portion with an upper nose, a lower vertical portion with a lower nose and a horizontal portion connecting between the upper vertical portion and the lower vertical portion, where the alternate second frame piece is a interchangeable with the first end cap and the second end cap;

wherein when the at least one alternate secondary frame piece is used in place of one of the plurality of secondary frame pieces, at least one of the plurality of primary frame pieces is substituted with the at least one alternate primary frame piece and at least one of the plurality of vanes is substituted with at least one alternate vane.

6. The active grille assembly of claim 1 further comprising at least one key slot formed each of the plurality of frame pieces, wherein the at least one key slot extends between the first end and the second end.

7. The active grille assembly of claim 6 further comprising one or more extruded rubber seals having a portion with a cross-sectional shape capable of mating with and sliding into the at least one key slot of the plurality of primary frame pieces for attaching the one or more extruded rubber seals to the plurality of primary frame pieces.

8. An active grille shutter arrangement having an assembled modular frame comprising:

a plurality of primary frame pieces, formed by extrusion with each one of the plurality of primary frame pieces having a first end, a second end, a hollow bore extending through the each one of the plurality of primary frame pieces forming an aperture at the first end of the hollow bore and an aperture at the second end of the hollow bore;

an upper frame portion of the assembled modular frame formed from at least one of the plurality of primary frame pieces;

a lower frame portion of the assembled modular frame formed from at least one of the plurality of primary frame pieces;

a plurality of secondary frame pieces formed by injection molding, each having an upper nose portion and a lower nose portion, wherein the plurality of secondary frame pieces include a first end cap connected to the upper frame portion at the upper nose portion and the first end cap connected to the lower frame portion at the lower nose portion, a second end cap of the plurality of secondary frame pieces connected to the upper frame portion at the upper nose portion and the second end cap connected to the lower frame portion at the lower nose portion, wherein when the first end cap and the second end cap are connected to the upper frame portion and the lower frame portion, one or more apertures of the assembled modular frame are defined by the first end cap, the second end cap, the upper frame portion and the lower frame portion;

a plurality of vanes formed by extrusion, rotatably positioned within the one or more apertures for controlling the amount of air flowing through the one or more apertures, wherein a first end of each of the plurality of vanes is rotatably connected to at least one of the first end cap and second end cap, and a motor connected to one of the plurality of vanes to facilitate rotation of the plurality of vanes.

9. The active grille assembly of claim 8 wherein each of the plurality of vanes is hollow and has an aperture at each end for receiving an end cap at the each end of the plurality of vanes, wherein the end cap has one or more posts configured to slide into a respective aperture on one of the first end cap of the plurality of second frame pieces or the second end cap or the plurality of second frame pieces, for rotatably connecting the plurality of vanes of the assembled modular frame.

10. The active grille assembly of claim 8 wherein each of the plurality of vanes has one or more pivot apertures at each end of the plurality of vanes for receiving posts formed on the surface of one of the first end cap of the plurality of second frame pieces and the second end cap of the plurality of second frame pieces, for rotatably connecting the plurality of vanes to the assembled modular frame.

11. An active grille assembly of claim 8 wherein the upper nose of the first end cap of the plurality of second frame pieces slides into the aperture at the first end of the upper frame portion and the lower nose of the first end cap of the plurality of second frame pieces slides into the aperture at the first end of the lower frame portion, while the upper nose of the second end cap of the plurality of second frame pieces slides into the aperture at the second end of the upper frame portion and the lower nose of the second and slides into the aperture at the second end of the lower frame portion.

12. The active grille assembly of claim 8 further comprising:
  at least one alternate primary frame piece having a length different than the other plurality of primary frame pieces;
  at least one alternate vane having a length different than the other plurality of vanes;
  at least one alternate secondary frame having an upper vertical portion with an upper nose, a lower vertical portion with a lower nose and a horizontal portion connecting between the upper vertical portion and the lower vertical portion, where the alternate second frame piece is a interchangeable with the first end cap and the second end cap;
  wherein when the at least one alternate secondary frame piece is used in place of one of the plurality of secondary frame pieces, at least one of the plurality of primary frame pieces is substituted with the at least one alternate primary frame piece and at least one of the plurality of vanes is substituted with at least one alternate vane.

13. The active grille assembly of claim 8 further comprising at least one key slot formed each of the plurality of frame pieces, wherein the at least one key slot extends between the first end and the second end.

14. The active grille assembly of claim 13 further comprising one or more extruded rubber seals having a portion with a cross-sectional shape capable of mating with and sliding into the at least one key slot of the plurality of primary frame pieces for attaching the one or more extruded rubber seals to the plurality of primary frame pieces.

15. An active grille shutter arrangement having an assembled modular frame comprising:
  a plurality of primary frame pieces, formed by extrusion with each one of the plurality of primary frame pieces having a first end, a second end, a hollow bore extending through the each one of the plurality of primary frame pieces forming an aperture at the first end of the hollow bore and an aperture at the second end of the hollow bore;
  an upper frame portion of the assembled modular frame formed from at least one of the plurality of primary frame pieces;
  a lower frame portion of the assembled modular frame formed from at least one of the plurality of primary frame pieces;
  a plurality of secondary frame pieces formed by injection molding each having an upper nose portion and a lower nose portion, wherein the plurality of secondary frame pieces include a first end cap connected to the upper frame portion at the upper nose portion and the first end cap connected to the lower frame portion at the lower nose portion, a second end cap of the plurality of secondary frame pieces connected to the upper frame portion at the upper nose portion and the second end cap connected to the lower frame portion at the lower nose portion, wherein when the first end cap and the second end cap are connected to the upper frame portion and the lower frame portion, one or more apertures of the assembled modular frame are defined by the first end cap, the second end cap, the upper frame piece and the lower frame portion;
  a plurality of vanes formed by extrusion, rotatably positioned within the one or more apertures for controlling the amount of air flowing through the one or more apertures, wherein a first end of each of the plurality of vanes is rotatably connected to at least one of the first end cap and second end cap;
  at least one alternate primary frame piece having a length different than the other plurality of primary frame pieces;
  at least one alternate vane having a length different than the other plurality of vanes;
  at least one alternate secondary frame piece having an upper vertical portion with an upper nose, a lower vertical portion with a lower nose and a horizontal portion connecting between the upper vertical portion and the lower vertical portion, where the at least one alternate secondary frame piece is a interchangeable with the first end cap and the second end cap, and
  wherein when the at least one alternate secondary frame piece is used in place of one of the plurality of secondary frame pieces, at least one of the plurality of primary frame pieces is substituted with the at least one alternate primary frame piece and at least one of the plurality of vanes is substituted with at least one alternate vane.

16. The active grille assembly of claim 15 wherein each of the plurality of vanes is hollow and has an aperture at each end for receiving an end cap at the each end of the plurality of vanes, wherein each end cap on each of the plurality of vanes has one or more posts configured to slide into a respective aperture on one of the first end cap, the second end cap, of one of the plurality of secondary frame pieces or the at least one alternate secondary frame piece for rotatably connecting the plurality of vanes of the assembled modular frame.

17. The active grille assembly of claim 15 wherein each of the plurality of vanes has one or more pivot apertures at each end of the plurality of vanes for receiving posts formed on the surface of one of the first end cap and the second end cap, for rotatably connecting the plurality of vanes to the assembled modular frame.

18. The active grille assembly of claim 15 further comprising at least one key slot formed each of the plurality of frame pieces, wherein the at least one key slot extends between the first end and the second end.

19. The active grille assembly of claim 17 further comprising one or more extruded rubber seals having a portion with a cross-sectional shape capable of mating with and sliding into the at least one key slot of the plurality of primary frame pieces for attaching the one or more extruded rubber seals to the plurality of primary frame pieces.

20. An active grille assembly of claim 15 wherein the upper nose of the first end cap slides into the aperture at the first end of the upper frame portion and the lower nose of the first end cap slides into the aperture at the first end of the lower frame portion, while the upper nose of the second end cap slides into the aperture at the second end of the upper frame portion and the lower nose of the second and slides into the aperture at the second end of the lower frame portion.

\* \* \* \* \*